US 6,707,190 B2

(12) United States Patent
Leibowitz

(10) Patent No.: US 6,707,190 B2
(45) Date of Patent: Mar. 16, 2004

(54) POWER CONVERSION APPARATUS AND METHODS

(76) Inventor: Martin Nick Leibowitz, 1155 Hillsboro Mile - Suite 602, Hillsboro Beach, FL (US) 33062

( * ) Notice: Subject to any disclaimer, the term of this patent is extended or adjusted under 35 U.S.C. 154(b) by 0 days.

(21) Appl. No.: 10/136,640

(22) Filed: Apr. 30, 2002

(65) Prior Publication Data

US 2002/0185928 A1 Dec. 12, 2002

Related U.S. Application Data

(60) Provisional application No. 60/287,297, filed on Apr. 30, 2001.

(51) Int. Cl.[7] .......................... H02K 16/00; H02K 51/00
(52) U.S. Cl. ...................... 310/75 R; 310/112; 74/89.2; 74/665 A
(58) Field of Search ..................... 310/112, 114–115, 310/118, 120, 75 R; 74/665 A, 665 B, 665 C, 63, 89.2; 290/6

(56) References Cited

U.S. PATENT DOCUMENTS

| 4,572,017 A | * | 2/1986 | Rossi ........................... 475/14 |
| 4,787,259 A | * | 11/1988 | Carson ....................... 74/89.2 |
| 5,260,617 A | | 11/1993 | Leibowitz |
| 5,387,818 A | | 2/1995 | Leibowitz |
| 6,239,524 B1 | | 5/2001 | Leibowitz |

* cited by examiner

*Primary Examiner*—Burton Mullins

(57) ABSTRACT

An energy conversion apparatus and method includes a central shaft rotatable around a first axis, at least one body rotating around a second axis, wherein the first axis and second axis intersect at a vertex, wherein the at least one body is connected to the central shaft and wherein the at least one body pivots about a point off the first axis and off the second axis, a drive means disposed adjacent to the at least one body, wherein the drive means is rotated by the at least one body, and a fixed core disposed around the central shaft, wherein the fixed core is connected to the drive means such that the at least one body is capable of orbiting around the fixed core.

24 Claims, 15 Drawing Sheets

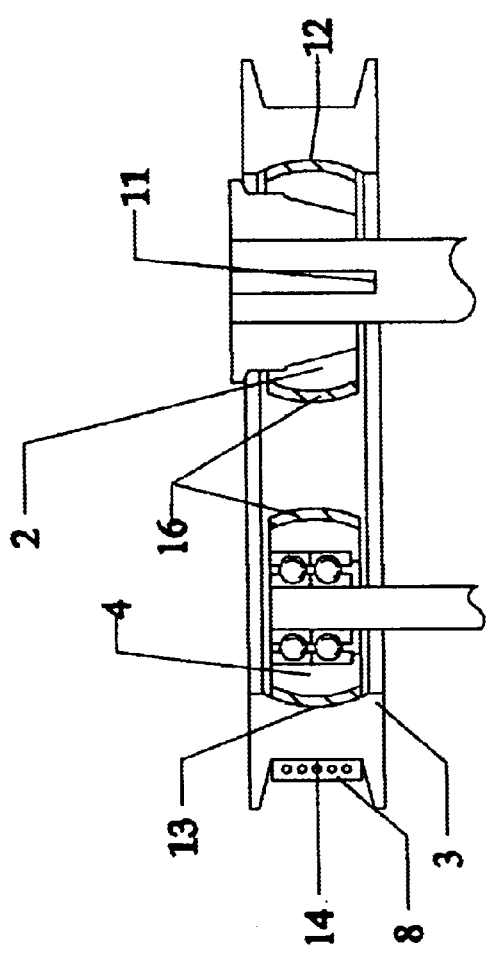
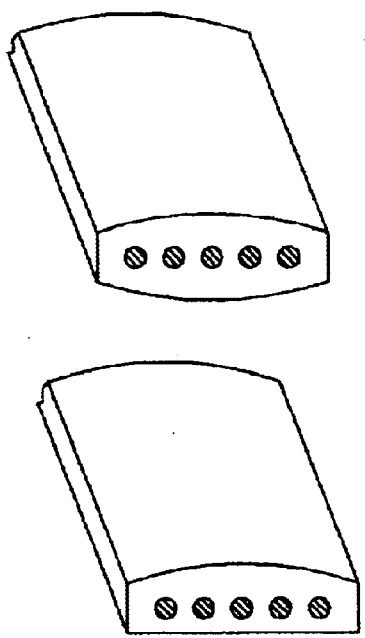
Fig. 4
Fig. 5

POWER CONVERSION APPARATUS AND METHODS

CROSS REFERENCE TO RELATED APPLICATIONS

This application claims priority of U.S. Provisional Application Ser. No. 60/287,297, filed Apr. 30, 2001, entitled OFF-BALANCED POWER CONVERSION APPARATUS & METHODS, the disclosure of which is incorporated by reference herein.

BACKGROUND OF THE INVENTION

1. Field of the Invention

The present invention improves the field of power conversion apparatus and in particular the field of power conversion apparatus utilizing orbiting masses in conjunction with axial rotation of the masses by creating a mechanical advantage, an Off-balance Force, to optimize the output of the rotating mass.

2. Background

The present invention relates to an improvement of a prior invention of the applicant disclosed in U.S. patent pending, application Ser. No. 09/503,446 entitled "Power Conversion Methods and Apparatus," which derived from provisional No. 60/209,204 entitled "Off-balanced Force apparatus and Methods." In that patent the operative aspects of the downhill effect are explained in detail. A subsequent provisional patent application Ser. Nos. 60/024,385 and 60/088,570 discloses improvements to a Downhill effect (DHE) arrangement. Even though those improvements were very helpful in attaining increases in velocity of the rotating mass, the speed was still not as high as planned or desired and there were limitations due to the load of the counter torque and the masses rotational ability. The present invention combines these same operative aspects along with different apparatus and methods from the pending patent to achieve the desired results of increased speed and overcoming resistance. Major improvements to boost productivity include allowing the surface of traction for rolling to move with the mass as a specialized rail.

In the many years of research and development, I have never come across another method of having the power source, such as an electric motor, roll and orbit, thus allowing its mass to contribute to the power of the overall shaft work by way of the above-specified mechanical advantages of the downhill effect. All of which are incorporated with the pending technology to create a system whose efficiency surpasses that of the traditional stationary power sources.

With this new improvement, we are able to apply the rotational method to the apparatus of the provisional patent entitled "Vertex Directed Force Apparatus and Methods," application No. 60/228,335 filed Aug. 28, 2000 by the inventor. This apparatus used the force generated by the orbiting mass and directed in a common vertex. Now the apparatus is capable of increasing its ability to orbit with the same effort thus greatly increasing its efficiency and push towards the vertex.

SUMMARY OF THE INVENTION

An embodiment of the present invention relates to an energy conversion apparatus and method includes a central shaft rotatable around a first axis, at least one body rotating around a second axis, wherein the first axis and second axis intersect at a vertex, wherein the at least one body is connected to the central shaft and wherein the at least one body pivots about a point off the first axis and off the second axis, a drive means disposed adjacent to the at least one body, wherein the drive means is rotated by the at least one body, and a fixed core disposed around the central shaft, wherein the fixed core is connected to the drive means such that the at least one body is capable of orbiting around the fixed core.

DESCRIPTION OF THE FIGURES

For the present invention to be understood clearly and readily practiced, the present invention will be described in conjunction with the following figures, wherein:

FIG. 4 is a schematic side view of one feature of a power conversion apparatus showing a roller, a hub, a regulator, and a drive means according to an embodiment of the present invention;

FIG. 5 shows alternative embodiments of the drive means according to the present invention;

DETAILED DESCRIPTION OF THE INVENTION

One embodiment of the present invention relates to a power conversion apparatus that includes rolling masses that rotate about a central drive shaft while rotating about their own center. However, the rotation of the masses about their center is eccentric or offset to the center of a ring or roller, which induces the rotation of the masses about their center and thereby creates the downhill effect and off-balance situation.

To accomplish the offset-leveraged rotation of the rolling mass at higher revolutions, I first provide a roller having an outer diameter and an inner diameter. An axle of the rolling mass is located within the inner diameter of the roller. A regulator is again used to maintain the offset between the center of the rolling mass and the center of the roller, by being in frictional contact with the inner diameter of the roller. This is as previously described in prior patents and provisional patent applications with the modification that the field and armature both do not turn in the same direction, only one will rotate while both orbit. Electrical motors, electrical generators or a combination of both may be used as the rolling masses.

A method and apparatus are also disclosed whereby rolling the mass in the positive direction of orbit is accomplished by having the roller in frictional contact with a drive member which is again frictionally connected to a stationary disc or cylinder located at the center of the central drive shaft. This allows the roller to turn inwards with the preferred direction of orbit and as a result, the roller turns the rotatable rail until it is able to have enough momentum to contribute work from its own rotating mass.

Another method and apparatus is disclosed whereby the force generated by the orbiting mass is redirected in a vertex-direction such that the rotation of the motor's axle results in orbiting and thus pushing towards a central vertex point.

Figure 1:
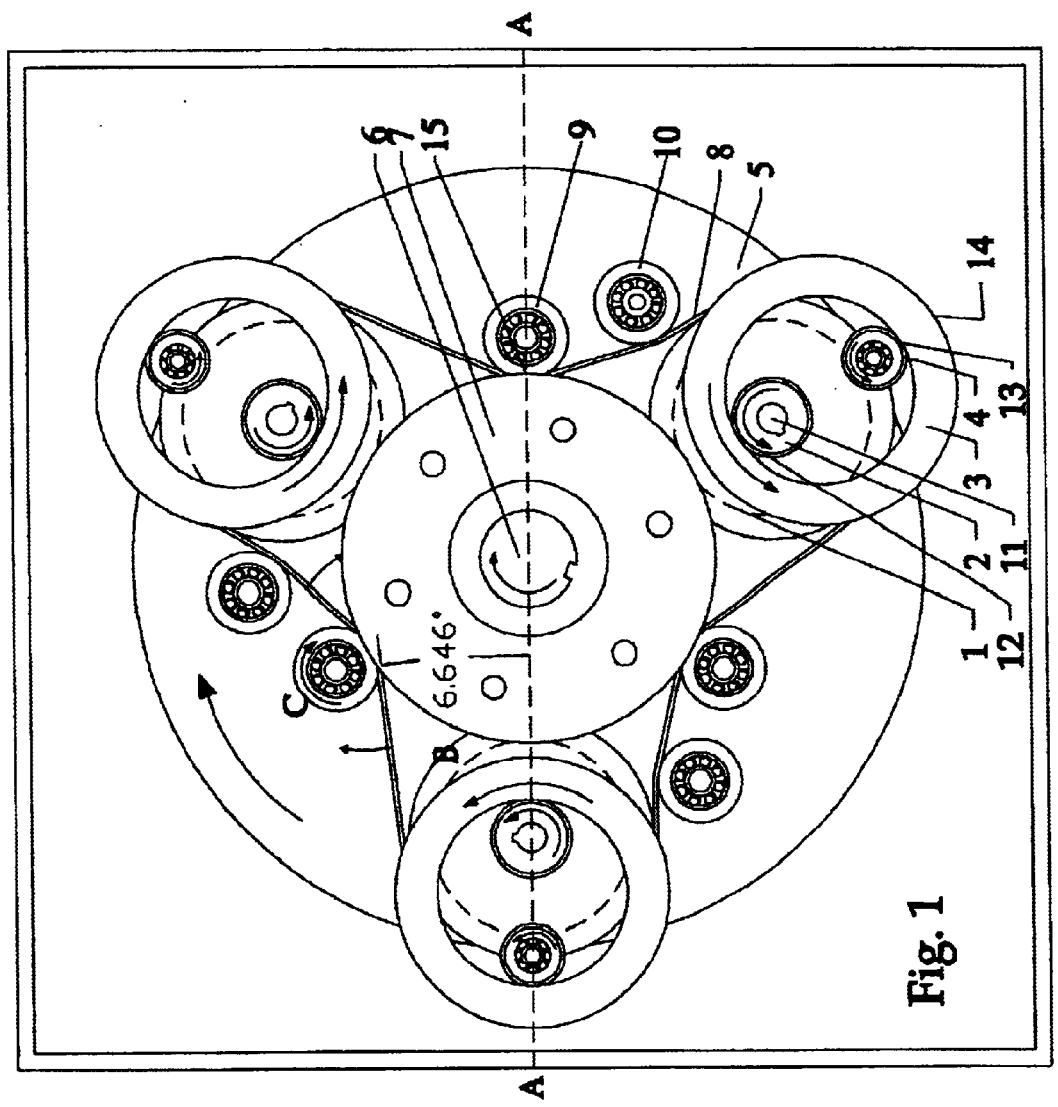
FIG. 1 is a schematic plan view of a power conversion apparatus according to an embodiment of the present invention.

FIG. 1 is a schematic plan view of three orbiting masses or bodies 1 fixedly connected to an orbiting plate 5 according to an embodiment of the present invention. A hub 2 is fixedly connected to the center of the orbiting masses 1 by an axial shaft 11. Hub 2 rotates axially with respect to orbiting masses 1. A roller 3 is positioned around hub 2 such that there is a frictional contact 12 between the inside diameter of roller 3 and the outer diameter of hub 2. A regulator 4 is in frictional contact with the inner diameter of roller 3 at point 13, such that contact point 13 is positioned 180 degrees across from the contact point 12. The roller is in frictional contact with a drive means 8. The average of the contact between the roller 3 and belt 8 is centered at point 14. According to this embodiment, drive means 8 is a belt that grips, without any slippage, roller 3, fixed core 7 and tension roller 9. According to other embodiments, drive means 8 may be a chain and sprocket or v-belt arrangement. There is also an idler roller 10 to maintain tension in the belt 8. All contact points 12, 13 and 14 are aligned radially outward from the center of the main shaft 6.

The frictional contact between the tension roller 9 and belt 8 and the frictional contact between belt 8 and fixed core 7 at point 15 allows the belt 8 to orbit around fixed core 7 as tension roller 9 rolls along the surface of belt 8. The mechanism that allows this is that tension roller 9 is attached to the same orbiting plate 5 as orbiting mass 1. The rolling occurs when the orbiting plate rotates around the axis of the central shaft 6 and pulls tension roller 9 along.

When hub 2 torques counterclockwise, roller 3 begins to roll counterclockwise. Due to the frictional contact between roller 3 and regulator 4, regulator 4 rolls in the counterclockwise direction. As roller 3 is rolling into belt 8, belt 8 begins to unwrap from the fixed core 7 at point 15. As stated above, now that the mass 1 has begun orbiting, tension roller 9 orbits and point 15 travels around the circumference of the fixed core 7. In fact, the orbiting mass 1, with all of its attachments, the tension roller 9, and the idler roller 10 orbit together, interacting instantaneously.

Another benefit of this embodiment over the current Patent pending instead of the multiple layers of belts there is only one belt needed for orbiting. This system then becomes more balanced and less vibration occurs. Note that there are still a top and a bottom assembly, which are identical, therefore having a total of two belts in a highly balanced apparatus.

Figure 2:
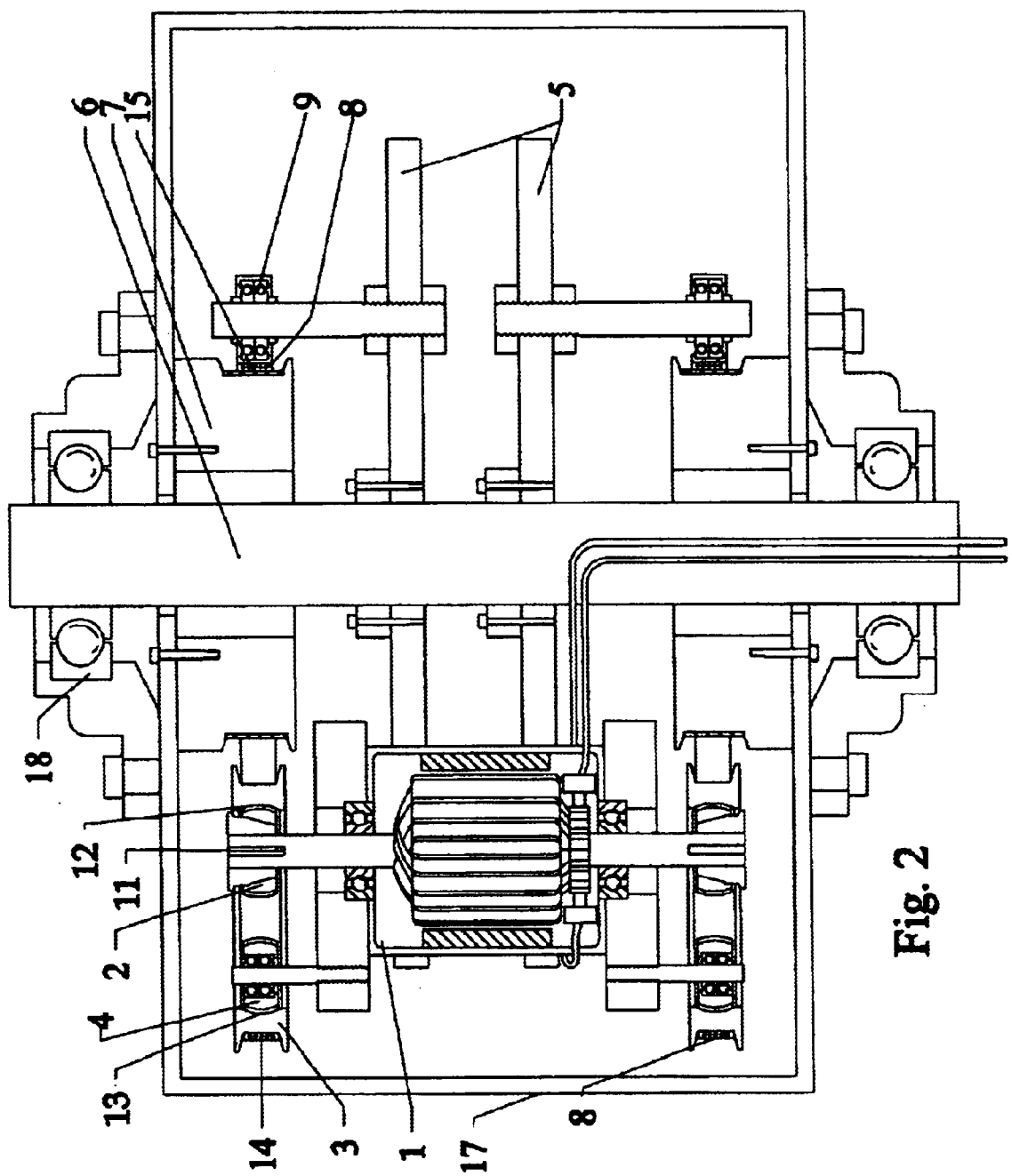
FIG. 2 is a schematic cross-sectional view of a power conversion apparatus along line A—A of FIG. 1 according to an embodiment of the present invention.

FIG. 2 is a schematic cross-sectional view along A—A of FIG. 1. This view shows how the tension roller 9 is connected to orbiting plate 5. It also depicts the manner in which the central shaft 6 is supported in the housing 17 by bearings 18. Note that the fixed core 7 is mounted to the housing 17 such that it does not rotate and is not in contact with the central shaft 6.

Figure 3:
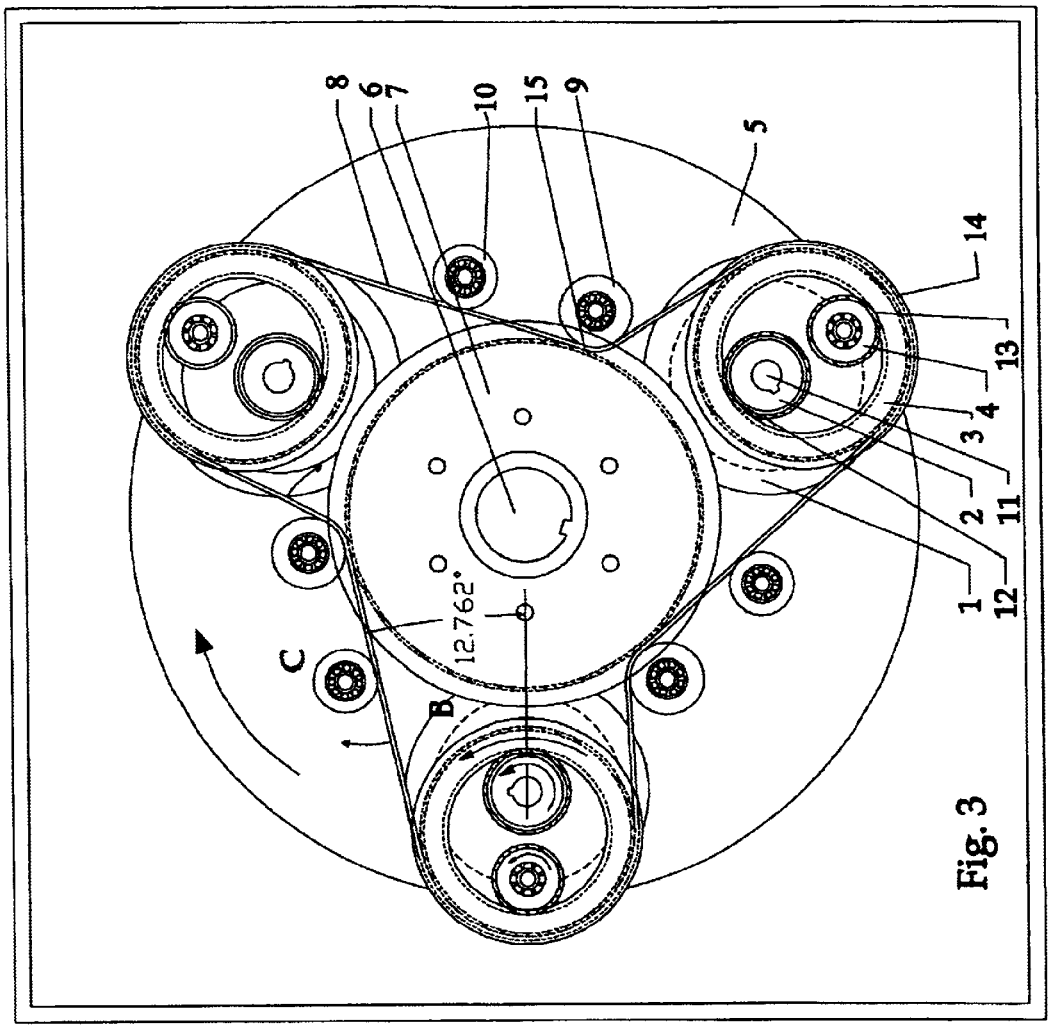
FIG. 3 is a schematic plan view of a power conversion apparatus showing a variation to the tension roller placement according to an embodiment of the present invention.

FIG. 3 is a schematic illustration as described by FIG. 1 with the modification that the tension roller 9 is located further around the fixed core 7. This positioning increases the gripping surface area between the belt 8 and the fixed core 7 as well as belt 8 with the tension roller 9. Another benefit to this embodiment is the increase in the angle between the orbiting mass 1 and the tension roller 9 from that of FIG. 1. This increase is believed to reduce the power needed to move the orbiting masses 1 around the central shaft 6.

FIG. 4 is a cross section of one roller 3, one hub 2, regulator 4 and belt 8. Regulator 4 is seen to have internal ball bearings. The method of frictional contact can be seen in this cross section.

Hub 2 and regulator 4 have convex arcs for their outer diameters, which are covered by a layer of rubber 16. The inside diameter of roller 3 has a mating concave arc such that the contact points 12 and 13, respectively, are generated between the hub 2 and the roller 3 and the regulator 4 and the roller 3. The contact is a form of a pinch grip-release, so that no slip, bind or jam occurs.

Roller 3 has a flat surface for its outer diameter. The belt 8 is also flat and matches the outer diameter of roller 3 such that the contact is along the entire surface.

FIG. 5 illustrates alternate embodiments that are envisioned for the belt 8. Where the belt would have arcs on the surface, which would mate to their respective friction points on the roller, tension roller, idler roller and fixed core.

Figure 6:
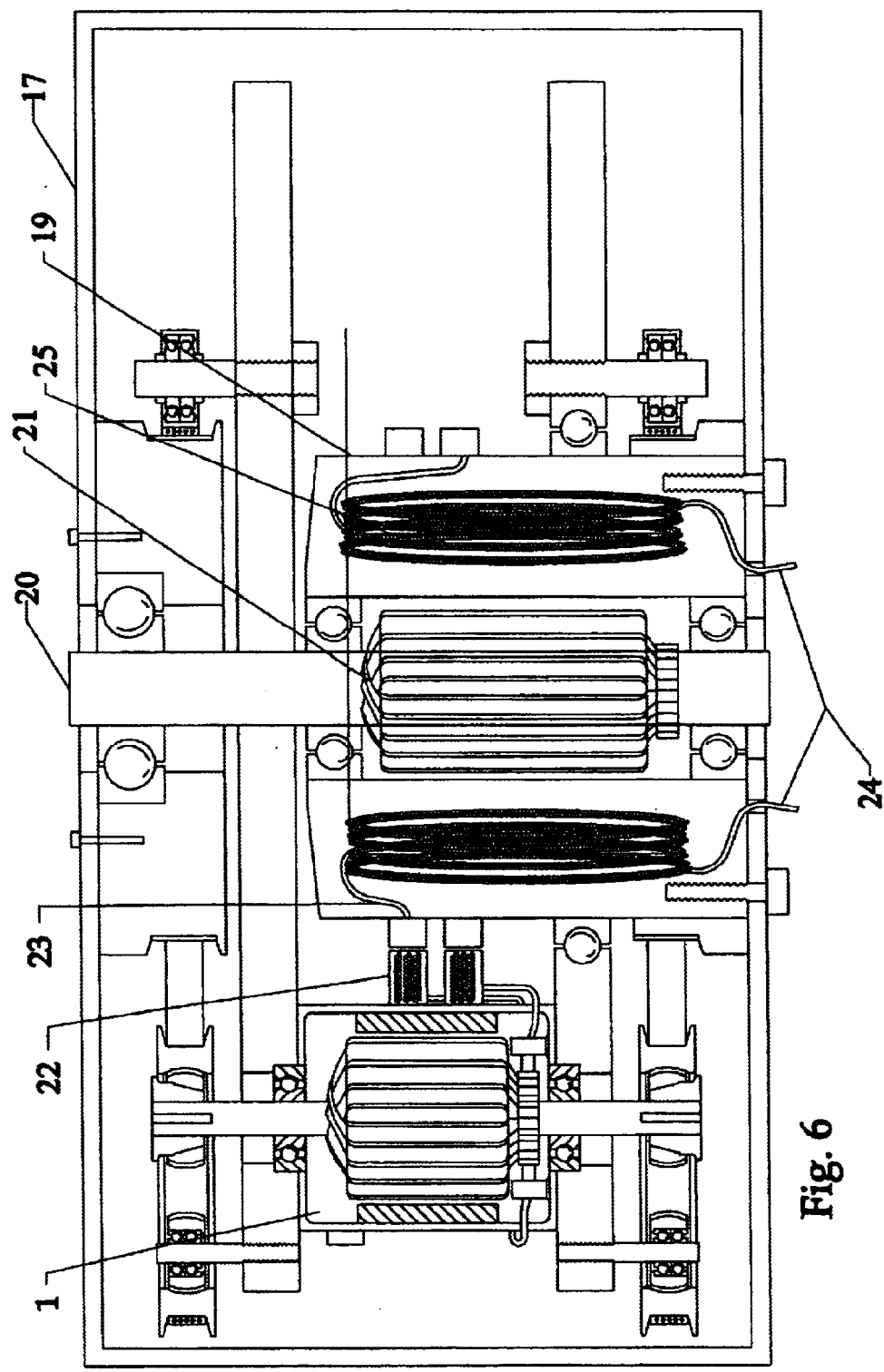
FIG. 6 is a schematic cross-sectional view of a power conversion apparatus showing an internal electro-magnetic generator according to an embodiment of the present invention.

FIG. 6 is a cross sectional view of an embodiment as described by FIG. 1 with the addition of an internal electromagnetic generator 19. The field 25 of generator 19 is fixedly connected to the housing 17 such that it is does not rotate. The central shaft 20 is now the same shaft as used for the armature 21 of the internal generator 19 and the orbiting of the masses 1 causes shaft 20 to rotate.

Electricity generated by the internal generator 19 is fed to the orbiting masses 1 by wires 23 from which the electricity is induced through mechanism 22 into the mass 1. Note the specifications are not provided for mechanism 22 as they may vary depending upon construction limitations. Electricity is also fed to the exterior of the housing by wires 24 to provide power for other electric equipment.

Figure 7:
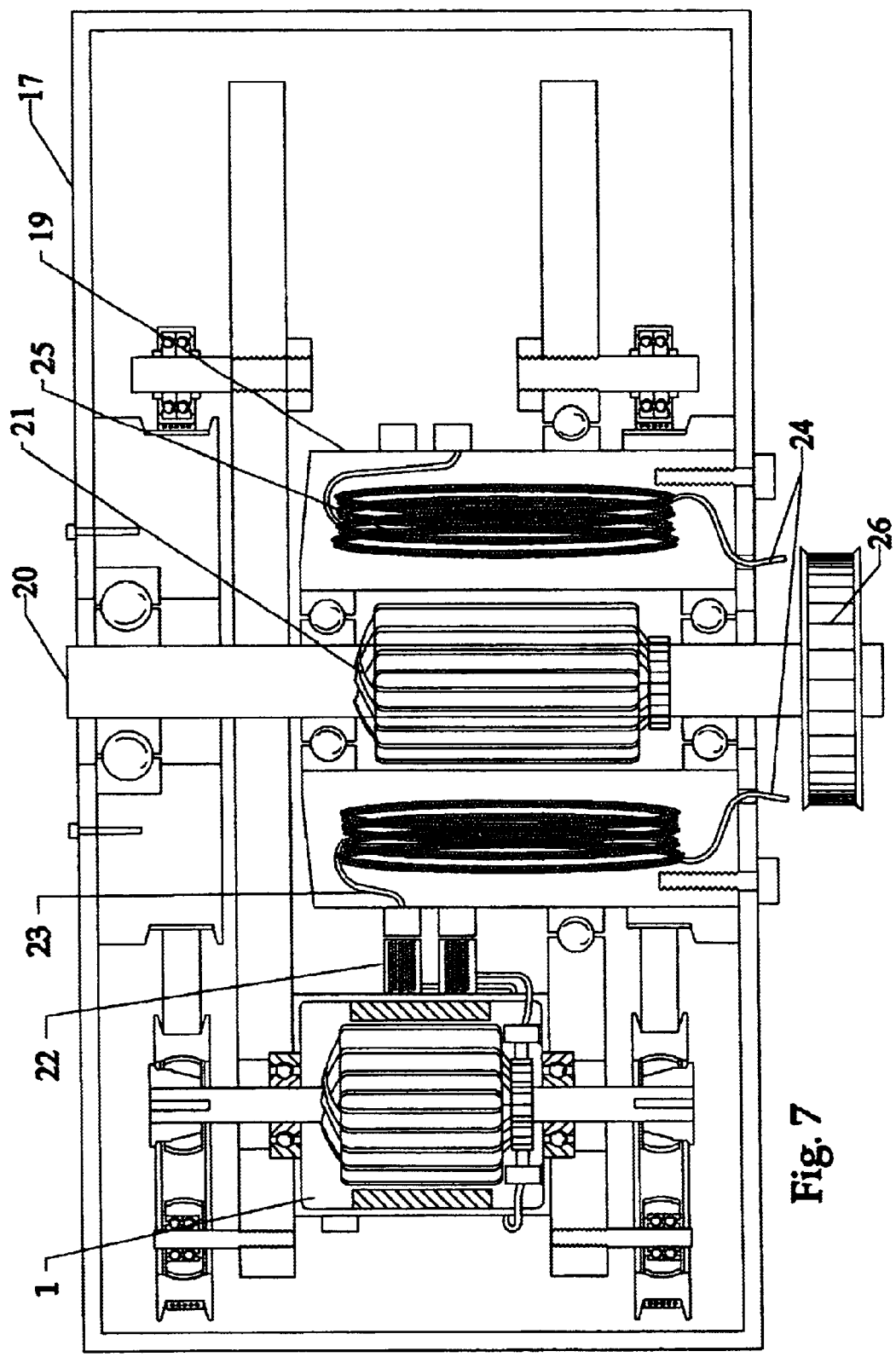
FIG. 7 is a schematic cross-sectional view of a power conversion apparatus showing an internal electro-magnetic generator with a pulley according to an embodiment of the present invention.

FIG. 7 is the same embodiment of FIG. 6 with a pulley 26 mounted to the central shaft 20. This pulley can be attached to other rotating equipment to torque drive those machines.

Figure 8:
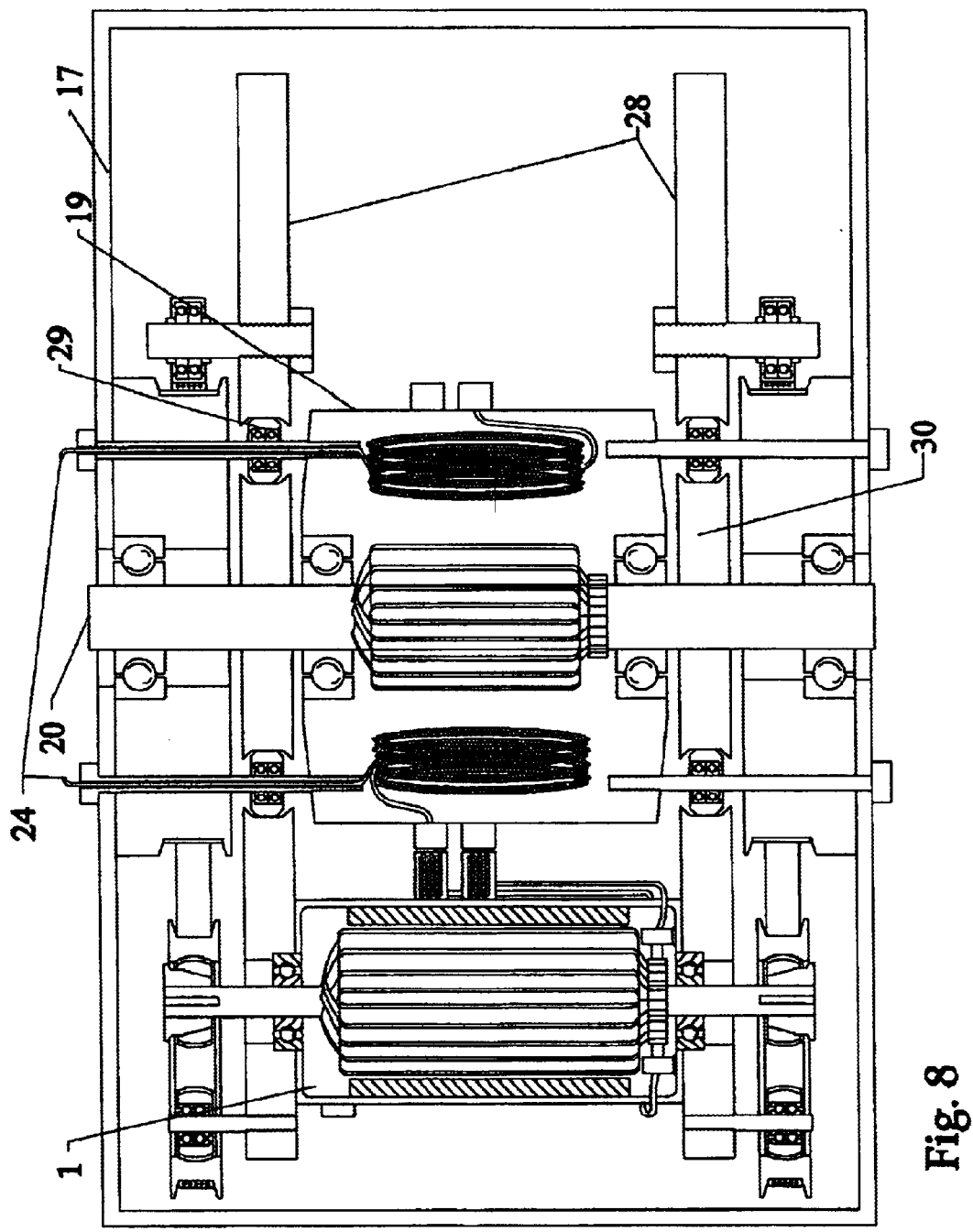
FIG. 8 is a schematic cross-sectional view of a power conversion apparatus showing an indirectly connected internal electro-magnetic generator according to an embodiment of the present invention.

FIG. 8 is a cross sectional view of an embodiment as described by FIG. 6 with the modification that the field of internal electro-magnetic generator 19 is now indirectly connected to the housing 17 by way of orbiting plate 28 and inner gear plate 30. Gears 29 rotationally connect orbiting plate 28 and inner gear plate. When orbiting mass 1 orbits, it rotates plate 28, which then causes the gears 29 to rotate. Because these gears are orbitally fixed, they cause plate 30 to rotate. Plate 30 is fixedly connected to central shaft 20. Note that depending on the number of gear transitions, the central shaft 20 may rotate in the same direction or the opposite direction as the orbiting plates 28 and the orbiting masses 1.

Figure 9:
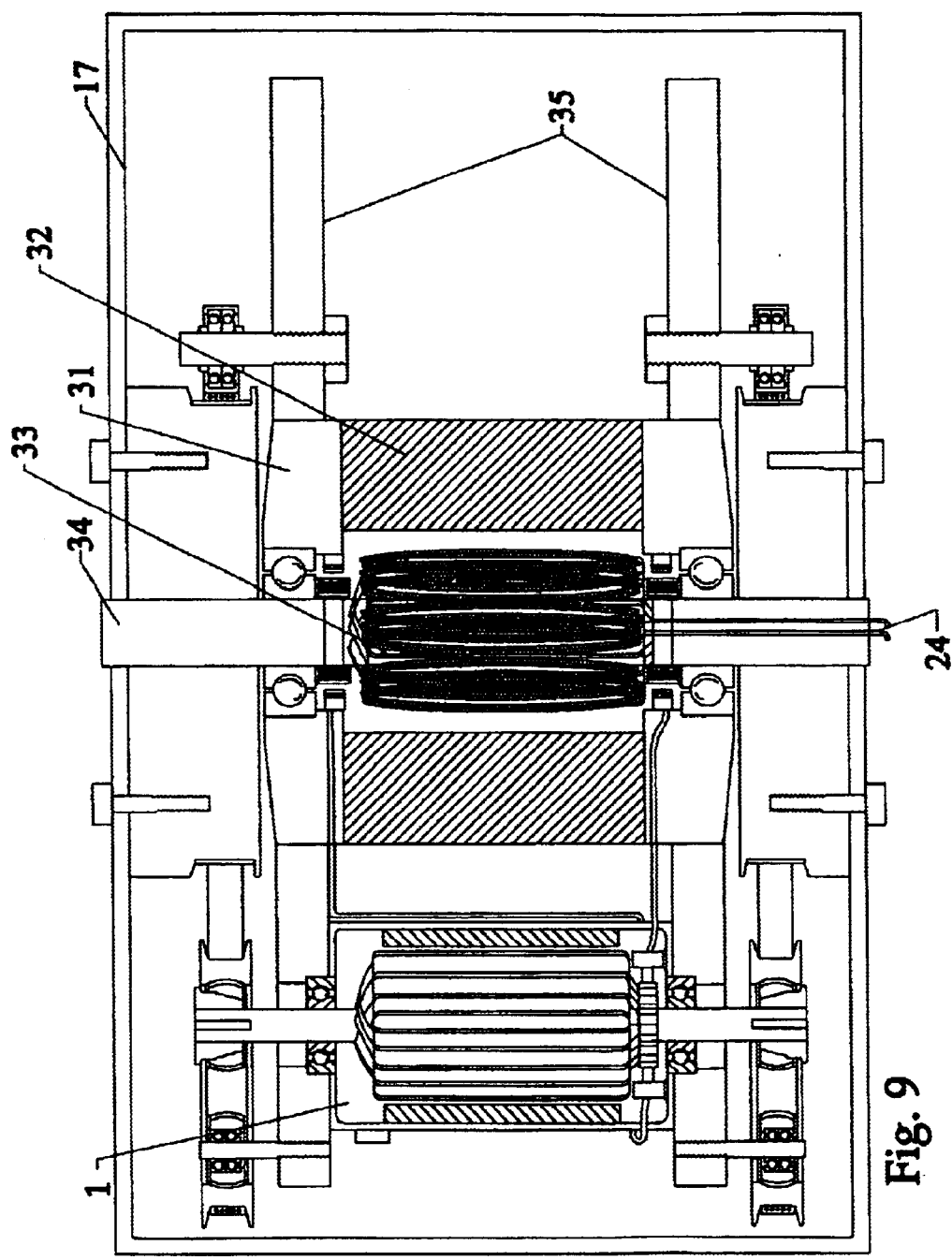
FIG. 9 is a schematic cross-sectional view of a power conversion apparatus showing an internal electro-magnetic generator with a non-rotational central shaft according to an embodiment of the present invention.

FIG. 9 is a cross-sectional view of the embodiment as described in FIG. 1 with the addition of an internal electro-magnetic generator 31. The center shaft 34 is also the shaft of the generator 31's armature 33. Note that the central shaft 34 is fixedly connected to the housing 17 and so in the generator armature 33, no rotational or axial movement is allowed.

The field 32 of generator 31 is fixedly connected to the orbiting plates 35 such that upon rotation and orbit of the orbiting mass 1 as detailed above, the field 32 will rotate around armature 33 to generate electricity.

Again, as with the functionality of the electricity of the generator, such power can be used internal and/or externally. But unlike the embodiments as expressed by FIGS. 6, 7 and 8, this embodiment does not allow for rotational work by the central shaft 34.

Figure 10:
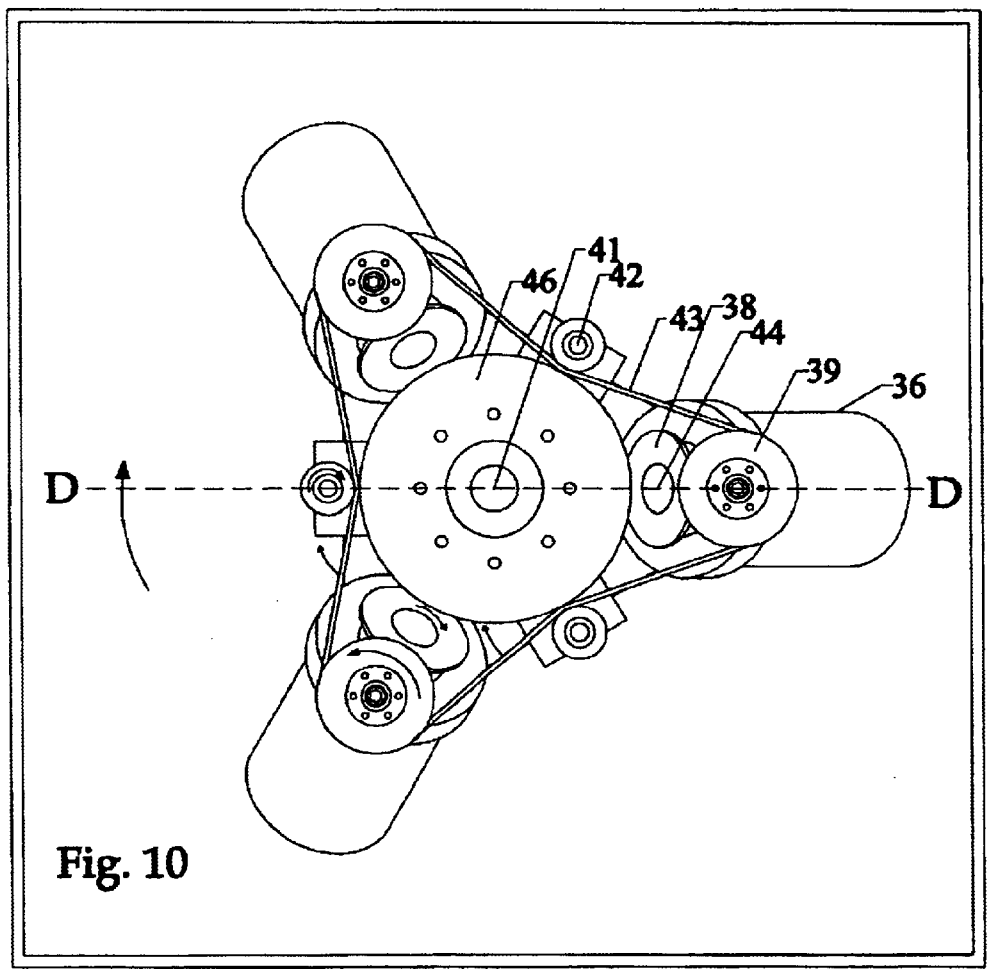
FIG. 10 is a schematic plan view of a power conversion apparatus with an upward thrust motor according to an embodiment of the present invention.
Figure 10A:
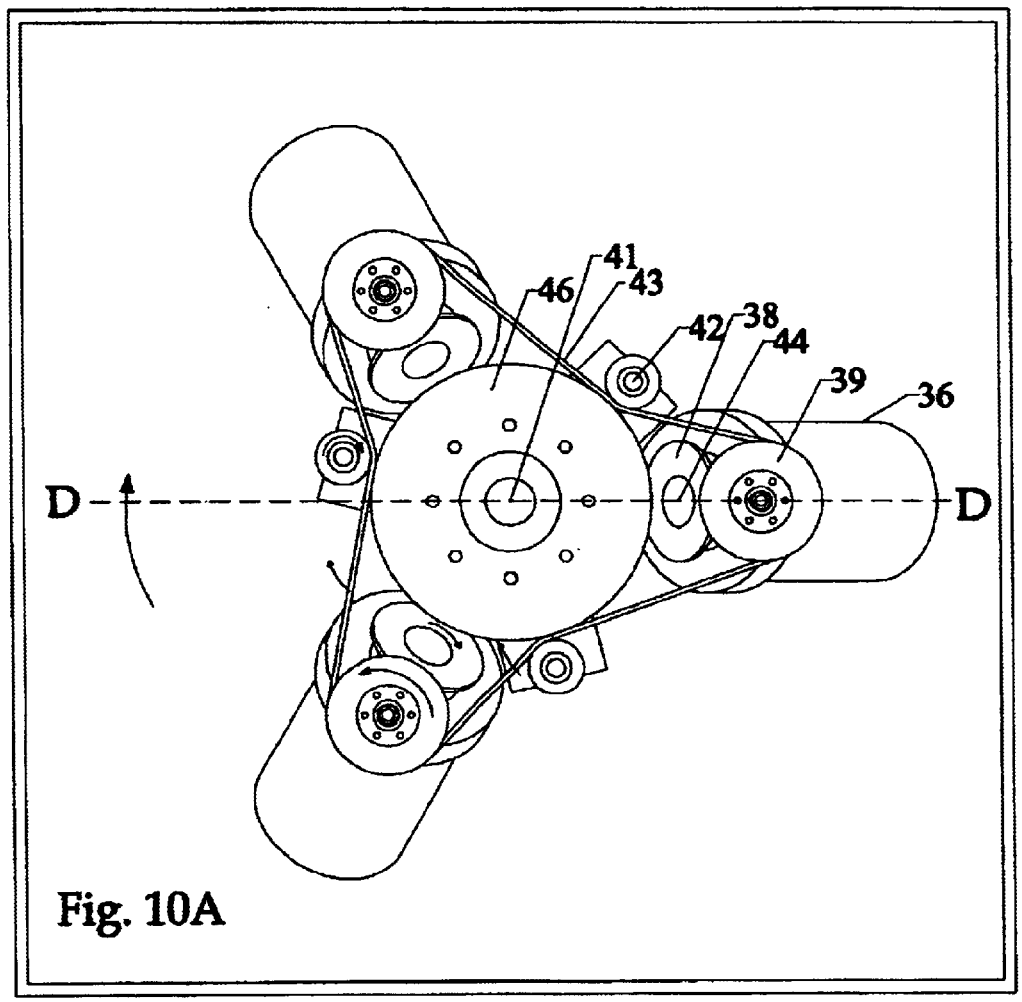
FIG. 10A is a schematic plan view of a power conversion apparatus with an upward thrust motor showing a variation to the tension roller placement according to an embodiment of the present invention.

FIG. 10 is a schematic plan view of three orbiting masses 36 where the method of rotation by a belt 43 is illustrated. When orbiting masses 36 begin to orbit the center shaft 41, a tension roller 42 presses against a fixed core 46 such that a hub 39 reacts as if the belt 43 were wrapped completely around the fixed core 46. This method of rotation is as described in the U.S. patent pending, application Ser. No. 09/503,446. The main difference is that there is no need for belts to be on multiple levels to the fixed core since the tension rollers 42 keep each hub independent from one another. FIG. 10A is a schematic plan view of a power conversion apparatus with an upward thrust motor showing a variation to the tension roller 42 placement according to an embodiment of the present invention.

Figure 11:
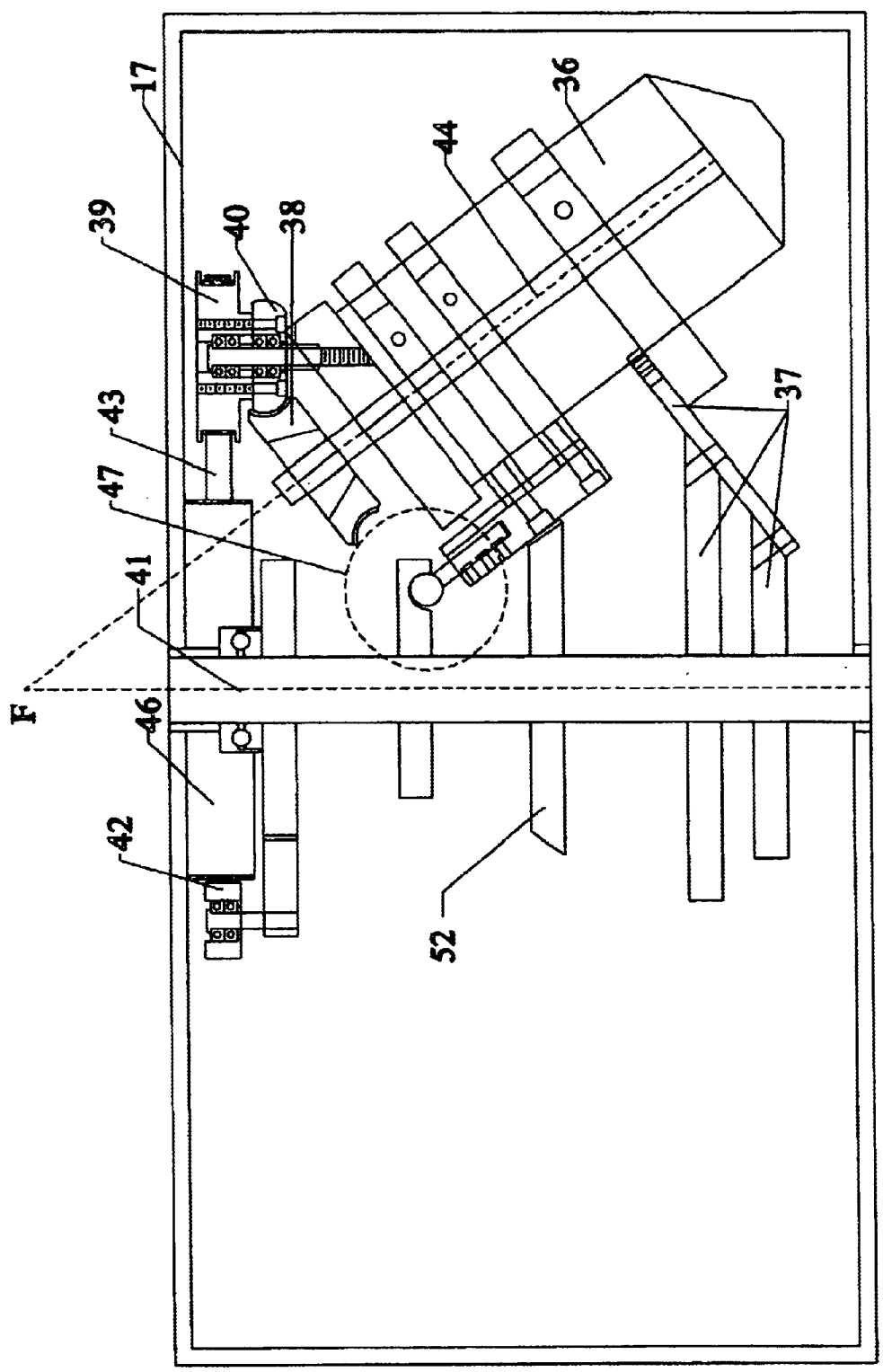
FIG. 11 is a schematic cross-sectional view of a power conversion apparatus with an upward thrust motor along line D—D of FIG. 10 according to an embodiment of the present invention.

FIG. 11 is a radial cross sectional plan view along D—D of FIG. 10 of one orbiting mass 36 including the method by which the force is translated towards a central vertex point F. When the orbiting mass 36 begins to orbit the center shaft 41, Centrifugal and Tangent forces are generated thus causing the mass 36 to pull away from the center shaft 41. However, due to a connection 47, which functions as a pivot system, the motor begins to feel an upward thrust Although FIG. 11 illustrates connection 47 as embodying a ball and socket arrangement, those skilled in the art will appreciate that other arrangements that restrict downward thrust may be suitable. The motor includes, for example, orbiting mass 36. In order to transfer the upward force of the mass 36, a hinge system 37 is fixedly attached to the center shaft 41 and to the mass 36. Hinge system 37 is not limited to a conventional hinge but may be, for example, a fixed bar. Since the shaft 41 is fixedly connected to the housing 17 and the motor through the pivot system 47, the entire apparatus will move toward vertex F. The vertex point F is continuously regenerating as the housing 17 moves, thus the mass 36 is always chasing that point. Note the methods of pivoting and limiting the mass may vary and are not to be limited by the embodiment presented herein. Although FIG. 11 illustrates center shaft 41 in a vertical position, it is not limited to a particular orientation.

The method of orbiting is explained as follows. Orbiting mass 36 is fixedly connected to hinge system 37. A hub 38 is fixedly connected to the center of the orbiting masses 36 by an axial shaft 44. Hub 38 rotates axially with respect to the orbiting mass 36. When hub 38 rotates, it rotates a transfer hub 40 by way of frictional contact. Transfer hub 40 is fixedly connected to an upper pulley 39 such that rotation of transfer hub 40 results is the equal rotation of pulley 39. A tension regulator 42 is positioned 180 degrees from pulley 39 such that the tension regulator 42 holds a drive means 43 to fixed core 46. In this embodiment, the drive means 43 is a timing belt.

Figure 12:
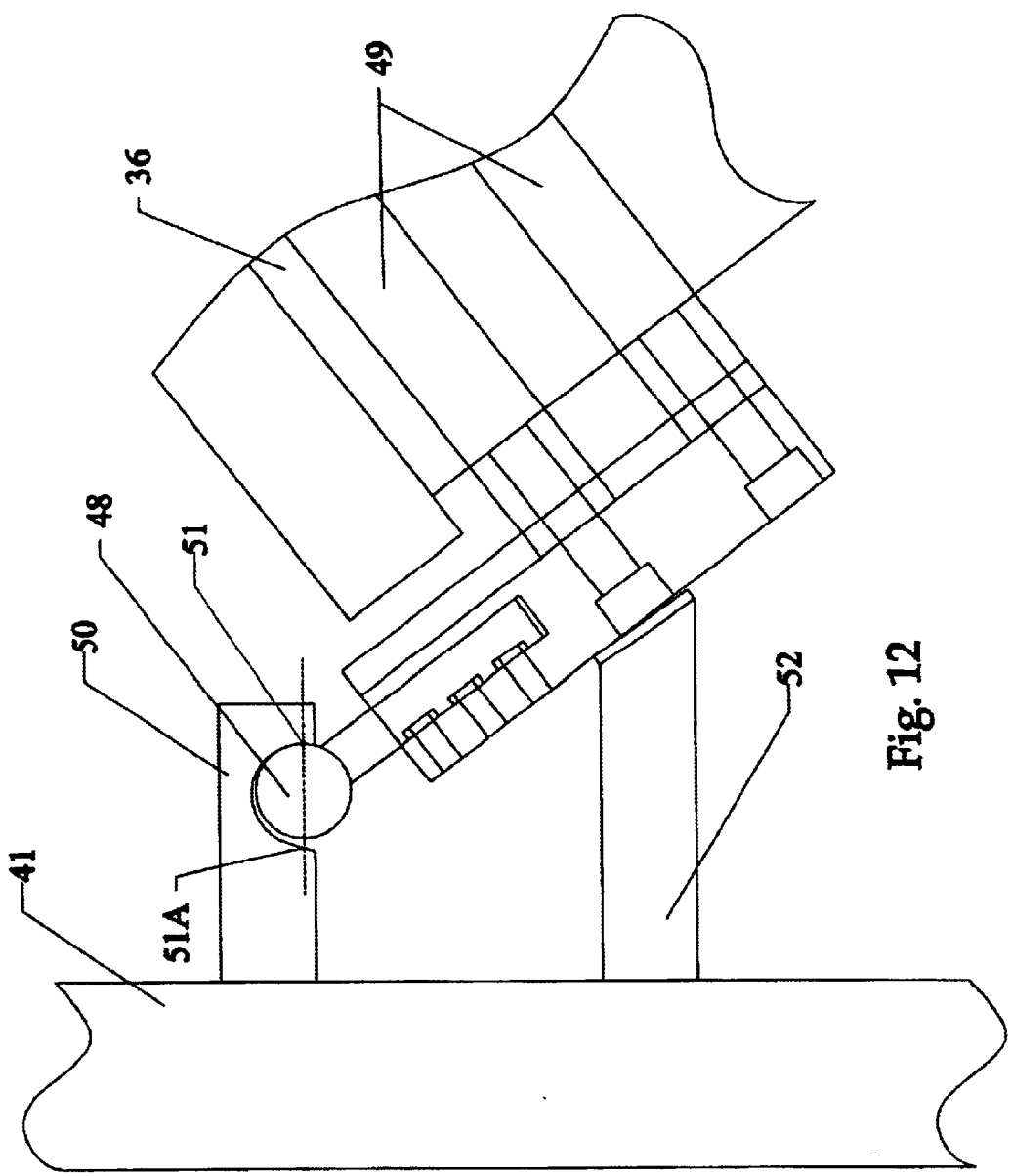
FIG. 12 is an exploded view of the pivot system shown in FIG. 11 according to an embodiment of the present invention.

FIG. 12 is a close up schematic view of pivot system 47. The innovation is that the pivot is not along the central line of the center shaft 41. Thus, it is governed by the same tangent and centrifugal forces as the orbiting mass 36. In this embodiment a sphere 48, directly connected to the orbiting mass 36 by brackets 49 is used as the pivot, which is connected to the main shaft 41 by a socket 50. When operation begins as specified by FIG. 11, sphere 48 moves outward and presses along a contact 51 and, thus, allows the mass 36 to feel the force upward from the pivot. Therefore, there is never a push against a back surface 51A of the socket 50 and, thus, no push down. Note that plate 52 is a resting plate when the apparatus is not in motion and is not an operating mechanism in the embodiment.

Figure 13:
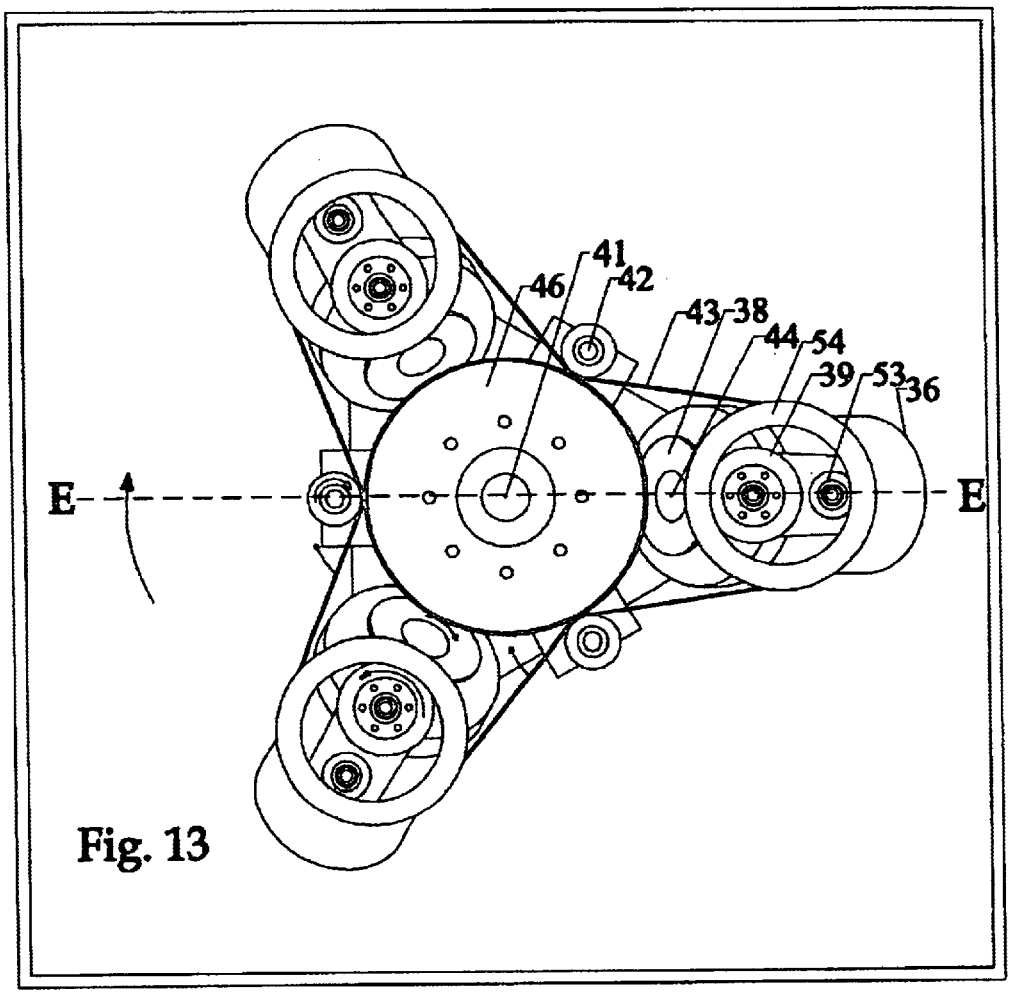
FIG. 13 is a schematic plan view of a power conversion apparatus with an upward thrust motor and a roller/hub/regulator configuration according to an embodiment of the present invention.

FIG. 13 is a schematic plan view of three orbiting masses 36 where the method of rotation has been slightly altered from the embodiment as expressed in FIG. 10; the hub 39 is now within a roller 54. Roller 54 is positioned around hub 39 such that there is a frictional contact between the inside surface of roller 54 and the outer surface of hub 39. A regulator 53 is in frictional contact with the inner surface of roller 54, such that the contact point is positioned 180 degrees across from the hub contact point. The roller 54 is in frictional contact with a specialized drive means 43. The mechanism by which this generates orbiting is as specified by the embodiment described by FIG. 1.

Figure 14:
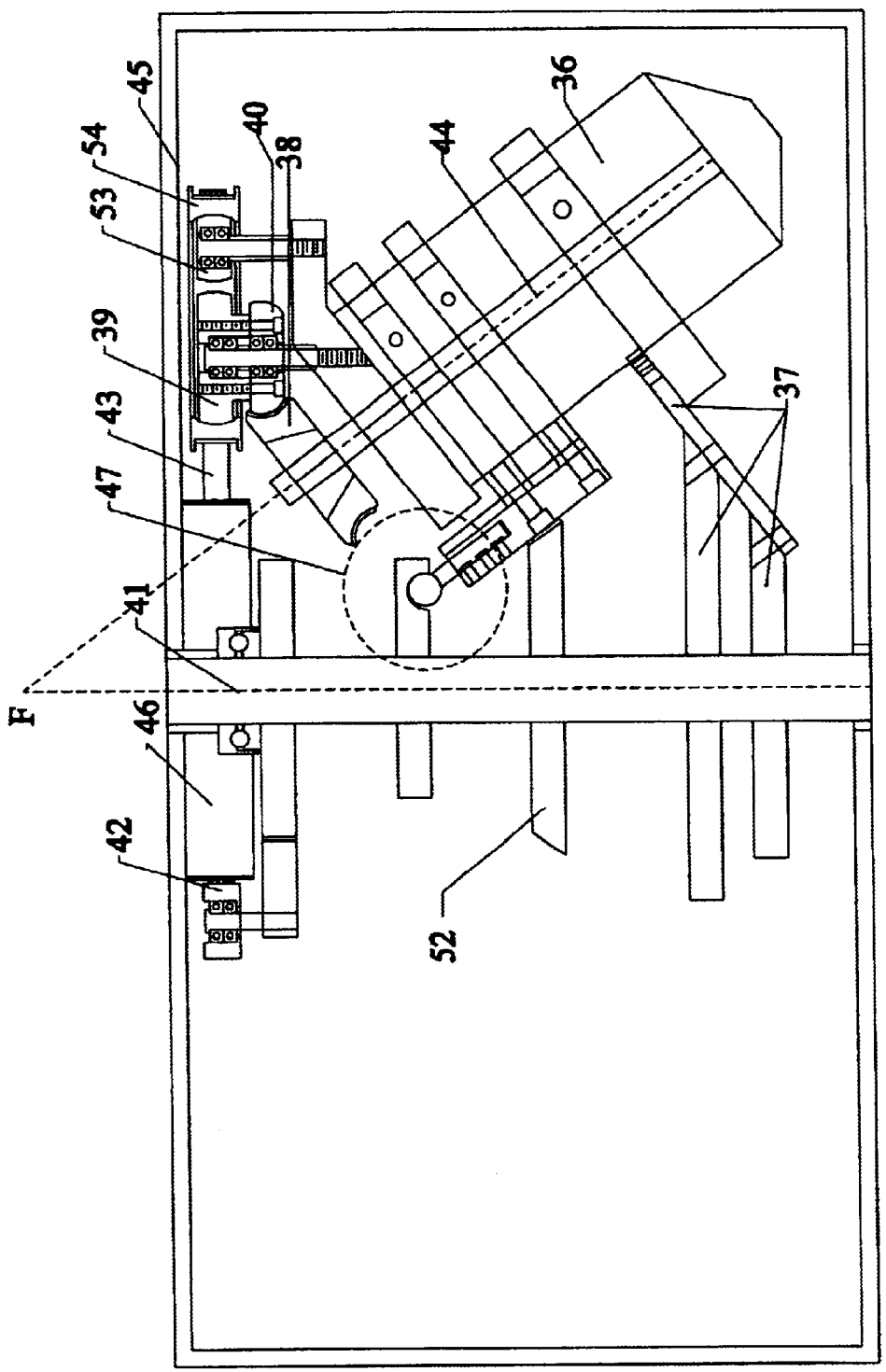
FIG. 14 is a schematic cross-sectional view of a power conversion apparatus with an upward thrust motor along line E—E of FIG. 13 according to an embodiment of the present invention.

FIG. 14 is a radial cross sectional plan view of FIG. 13 where the frictional contact between the hub 39 and the roller 54 and the regulator 53 and roller 54 are seen in detail. Note that the mechanisms by which the centrifugal and tangent forces are translated towards the vertex point F remain the same.

The present invention may also be adopted with various other methods of frictional contact, including those disclosed in any of the previous applications specified above. Furthermore, any of the orbiting masses described above may be electrical motors, electrical generators or any combination thereof as well as varying numbers of such orbiting masses can be incorporated to any embodiment.

Figure 16:
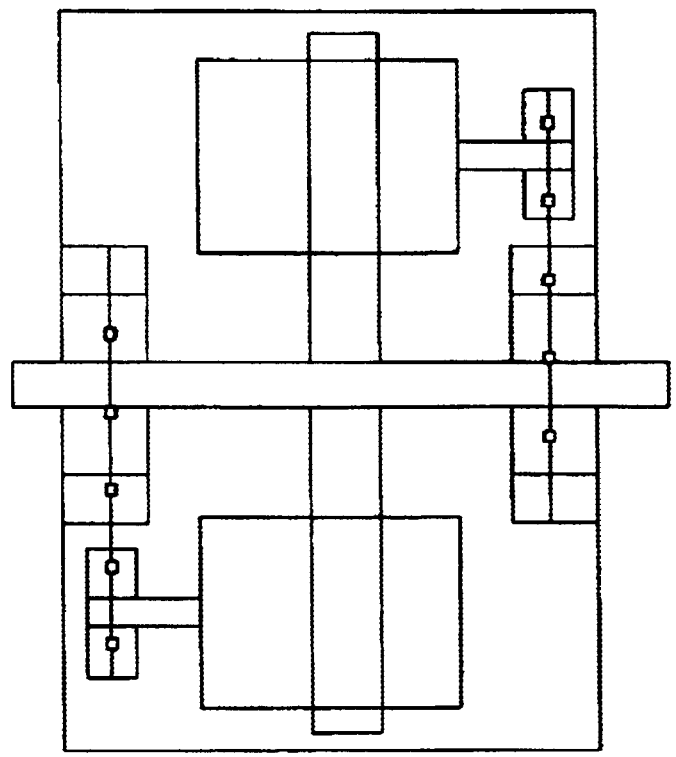
FIG. 16 is a schematic cross-sectional view of a power conversion apparatus according to an embodiment of the present invention.
Figure 15:
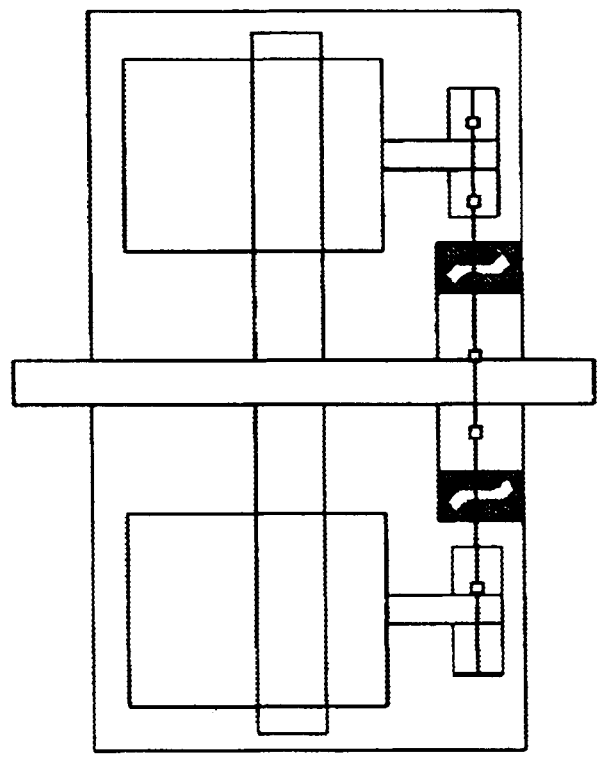
FIG. 15 is a schematic cross-sectional view of a power conversion apparatus according to an embodiment of the present invention.

FIGS. 15 and 16 schematically illustrate some of the further embodiments of the present invention. FIG. 15 illustrates the use of a fixed core 7 below the housing of the electrical motors 1. FIG. 16 illustrates two fixed cores 7 with motors 1 alternatively arranged end for end. One of ordinary skill in the art will appreciate other suitable combinations.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the description and drawings. For example, although the above-described embodiments illustrate three orbiting masses, one of ordinary skill in the art will appreciate that one or more orbiting masses may be used without departing from the principles of the invention.

What is claimed is:

1. An apparatus comprising:
   a fixed core;
   a central shaft having a central axis, the central shaft being rotatable about the central axis and disposed within the fixed core;
   at least one body having a body axis and coupled to the central shaft, the at least one body being rotatable about the body axis, the body axis being parallel to the central axis;
   a roller having an annulus and a roller axis, the roller being rotatable about the roller axis, the roller axis being parallel to the central axis, the annulus further having an inner surface and the at least one body engaging the inner surface of the annulus;
   a regulator having a regulator axis, the regulator being rotatable about the regulator axis, the regulator axis being parallel to the central axis, the regulator engaging the inner surface of the annulus so that the roller is rotatable about the roller axis; and
   drive means connecting the roller to the fixed core so that when the at least one body rotates about the body axis the roller orbits around the fixed core and causes the central shaft to rotate about the central axis.

2. The apparatus of claim 1 wherein the fixed core is centered on the central axis.

3. The apparatus of claim 1 wherein the central shaft is capable of rotating independently of the fixed core.

4. The apparatus of claim 1 further comprising an orbiting plate for coupling the at least one body to the central shaft.

5. The apparatus of claim 1 wherein the at least one body includes an axial shaft having a first end and a second end, the first end being fixedly attached to the at least one body, the second end being fixedly attached to a hub, and the hub being adapted to engage the inner surface of the annulus.

6. The apparatus of claim 1 wherein the hub has a surface having a shape substantially complementary to the inner surface of the annulus.

7. The apparatus of claim 1 further comprising a tension roller disposed adjacent to the fixed core and adapted to grip the drive means.

8. The apparatus of claim 1 wherein the regulator comprises ball bearings.

9. The apparatus of claim 1 wherein the drive means comprises a belt.

10. The apparatus of claim 1 wherein the at least one body comprises a motor.

11. The apparatus of claim 1 further comprising
    a housing mounted to the fixed core; and
    a field disposed within the housing, wherein the central shaft comprises an armature such that the field and the central shaft comprise a generator.

12. The apparatus of claim 11 further comprising
    means for electrically coupling the generator to the at least one body.

13. An apparatus comprising:
    a fixed core;
    a central shaft having a central axis, the central shaft being rotatable about the central axis and disposed within the fixed core;
    at least one body having a body axis and coupled to the central shaft, the at least one body being rotatable about the body axis, the central axis and the body axis intersecting at a vertex, and the at least one body pivoting about a point off the central axis and off the body axis; and
    drive means connecting the at least one body to the fixed core so that when the at least one body rotates about the body axis the at least one body orbits around the fixed core and causes the central shaft to rotate about the central axis.

14. The apparatus of claim 13 wherein the fixed core is centered on the central axis.

15. The apparatus of claim 13 wherein the at least one body comprises a body axle rotatable about the body axis.

16. The apparatus of claim 13 wherein the central shaft is capable of rotating independently of the fixed core.

17. The apparatus of claim 13 wherein the at least one body pivots by a ball and socket arrangement.

18. The apparatus of claim 13 further comprising
    a hinge fixedly attached to the central shaft and to the at least one body.

19. The apparatus of claim 13 further comprising an orbiting plate for coupling the at least one body to the central shaft.

20. The apparatus of claim 13 further comprising
    a hub; and
    an axial shaft having a first end and a second end, the first end being fixedly attached to the at least one body, the second end being fixedly attached to the hub, and the hub being adapted to engage the drive means.

21. The apparatus of claim 13 wherein the drive means comprises a belt.

22. The apparatus of claim 13 further comprising
    a roller having an annulus and a roller axis, the roller being rotatable about the roller axis, the roller axis being parallel to the central axis, the annulus further having an inner surface and the at least one body engaging the inner surface of the annulus; and
    a regulator having a regulator axis, the regulator being rotatable about the regulator axis, the regulator axis being parallel to the central axis, the regulator engaging the inner surface of the annulus so that the roller is rotatable about the roller axis.

23. An apparatus comprising:
    a fixed core;
    a central shaft having a central axis, the central shaft being rotatable about the central axis and disposed within the fixed core;
    a first body having a first body axis and coupled to the central shaft, the first body being rotatable about the first body axis, the central axis and the first body axis intersecting at a vertex, and the first body pivoting about a first point off the central axis and off the first body axis;
    a second body having a second body axis and coupled to the central shaft, the second body being rotatable about the second body axis, the central axis and the second body axis intersecting at the vertex, and the second body pivoting about a second point off the central axis and off the second body axis;

a tension roller positioned substantially adjacent to the fixed core; and drive means connecting the first body and the second body to the fixed core and disposed between the tension roller and the fixed core so that when the first body rotates about the first body axis and the second body rotates about the second body axis the first body and the second body orbits around the fixed core and causes the central shaft to rotate about the central axis.

24. The apparatus of claim 23 wherein the fixed core is centered on the central axis.

* * * * *